INVENTOR.
John Hubbard,

Patented July 8, 1924.

1,500,621

UNITED STATES PATENT OFFICE.

JOHN HUBBARD, OF SEVEN KINGS, ENGLAND, ASSIGNOR OF ONE-HALF TO ARTHUR PHILIP CROUCH, OF LONDON, ENGLAND.

MEANS AND METHOD FOR PREPARING RUBBER GOODS FOR VULCANIZATION.

Application filed September 12, 1922. Serial No. 587,719.

*To all whom it may concern:*

Be it known that I, JOHN HUBBARD, a subject of the King of England, residing at Seven Kings, Essex, England, have invented certain new and useful Improved Means and Methods for Preparing Rubber Goods for Vulcanization, of which the following is a specification.

This invention relates to improved means for and method of preparing rubber goods for vulcanization and has for its object to enable a greater variety of rubber goods to be vulcanized in coverings of foil than has hitherto been possible. It has been known that articles of simple form, such as combs, prior to the shaping of the teeth, which is effected after vulcanization by cutting, could be vulcanized by covering the dough with a foil sheath applied by pressing both the dough and the sheath in a mould. The article thus shaped and covered with foil was then removed from the mould and put into a vulcanizing chamber under steam pressure.

If this system could be applied more generally, it would be of great utility as fewer moulds would be required for the production of a given number of goods because the mould would only be used to shape the dough and simultaneously enclose it in its foil covering after which the shaped piece could be removed and the mould would thereafter be ready for shaping the next article, whereas when the article is vulcanized in the mould, the mould has to be put bodily into the vulcanizing chamber, and therefore the time in which each mould is in occupation for the manufacture of a single article is greatly increased. The system by which the mould is dispensed with during the process of vulcanization also effects a reduction of cost in vulcanizers because for a given number of goods foil vulcanizers can be used and the space previously occupied in the vulcanizing chamber by the moulds can now be occupied by the goods.

Previously, however, it has been found that it has not been possible to encase rubber goods in foil by moulding when such goods had enlarged or shouldered portions because the foil invariably cracked and consequently the goods were spoiled during the vulcanizing process. By means of this invention this difficulty is obviated.

The apparatus for preparing goods for vulcanization by moulding them and simultaneously covering them with a foil, consists, according to this invention, of a multipart mould in which the parts are arranged to not only separate along one or more planes, such as are necessary for extracting the article, but also to separate along other planes which intersect the article at or near portions whose shape would cause the foil to split, such as enlargements or shoulders, and in such direction as to allow the material to be bunched at these portions prior to the complete closure of the mould.

This invention further relates to a method of operating the mould hereinbefore described which consists in (*a*) introducing dough with a layer of foil, say tinfoil, on each side of it between those parts of the mould. (for example two halves, which separate along the longitudinal axis) which are made separate for the purposes of accessibility; (*b*) applying pressure to the mould in the usual direction for closing it but only to such a degree as shall be sufficient to partially shape the article and cause some of the dough and foil to bunch in the spaces afforded by the two extensions of those parts which are separable to permit of such bunching; (*c*) closing these extended parts of the mould under full pressure whilst retaining the pressure already applied for ordinary closing, and (*d*) applying full pressure in the ordinary closing direction.

The invention is more particularly described with reference to the accompanying drawings, in which—

In the drawings like letters denote like parts throughout the several views.

Figure 1:
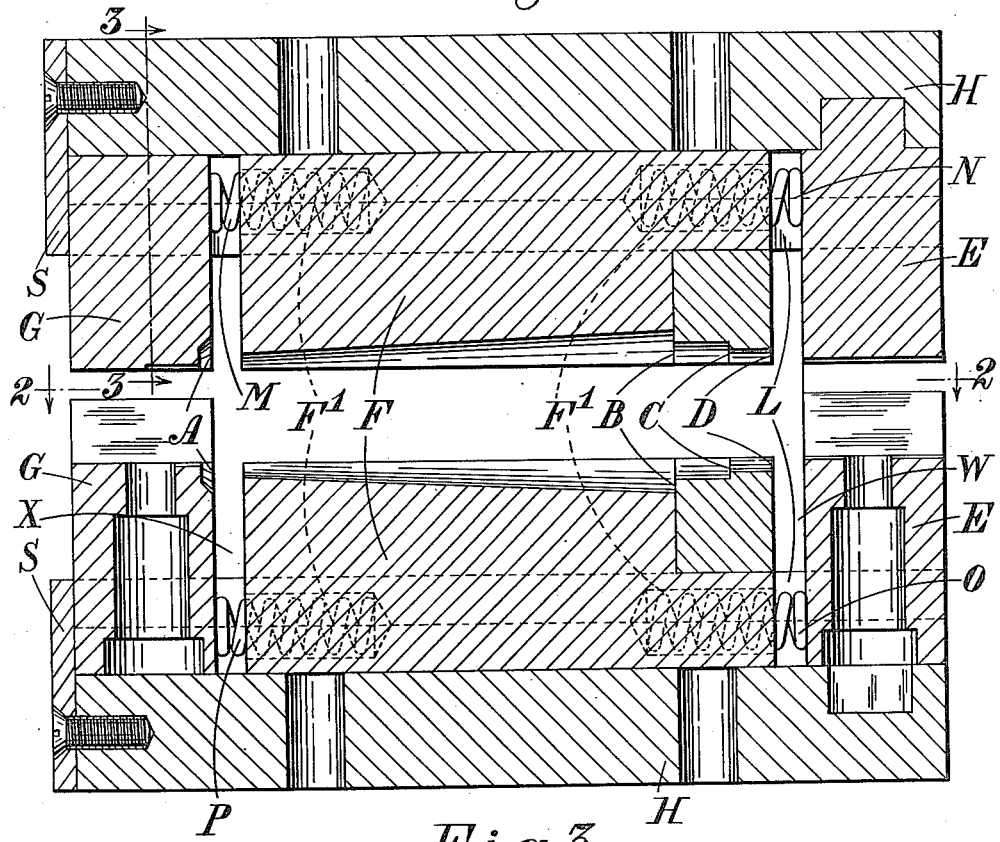
Figure 1 illustrates a vertical sectional elevation of a mould, according to this invention which is designed for the moulding of pipe stems.
Figure 3:
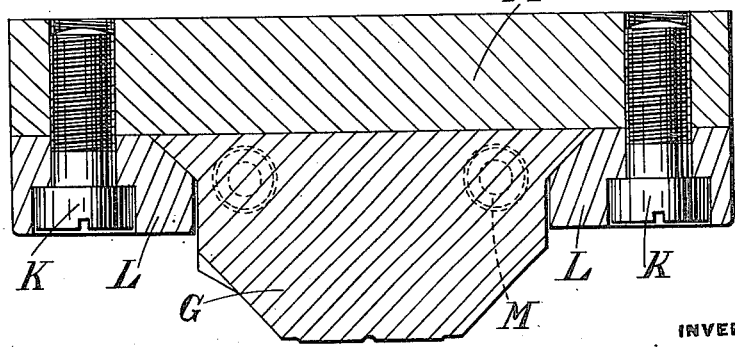
Figure 3 illustrates a vertical sectional view of the upper half of the mould taken on the line 3—3 in Figure 1.
Figure 2:
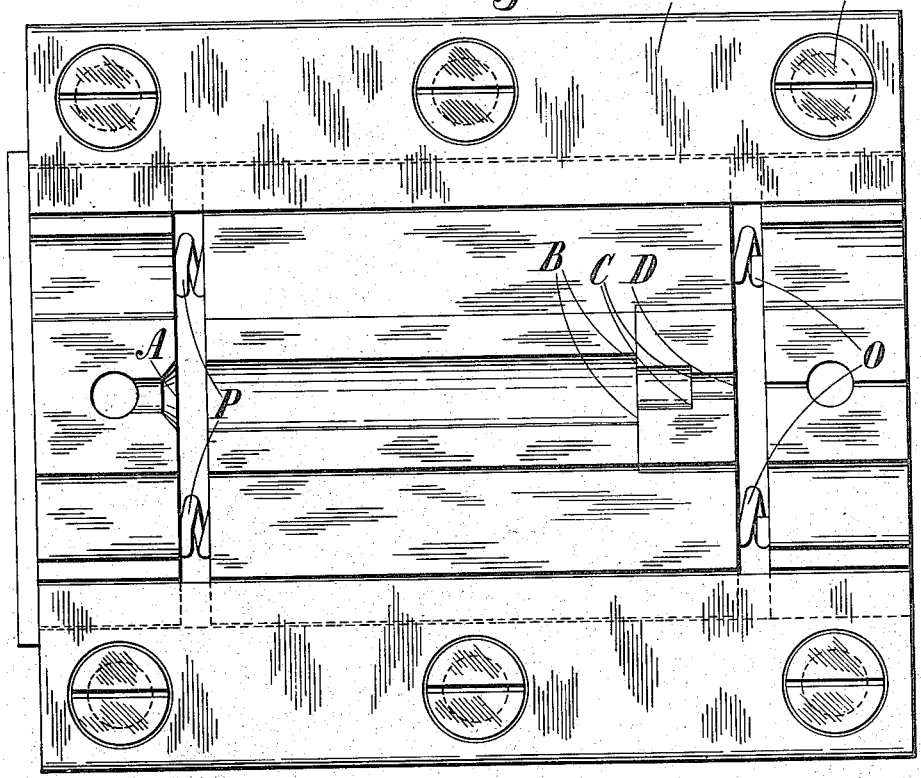
Figure 2 is a plan view of the lower half of the mould as illustrated in Figure 1.

The mould illustrated in the drawings is applied to the production of pipe stems and is made in two separable parts in the usual manner, the plane of meeting which extends through the longitudinal axis 2—2 (Figure 1) including the longitudinal axis of the pipe stem.

A pipe stem, as is known, has a flange A (Figure 6) at the end remote from the pipe-bowl, and the part which enters the bowl is reduced so that one or more shoulders B, C and D are provided. It is the moulding of the flange and the shoulders at the reduced end of the stem which cause the foil to split, and therefore the mould, in addition to the usual division above referred to, is divided transversely into three parts, one division being along the plane in which the flange A lies, and the other division along a plane in which the shoulder B lies. The parts formed by so dividing the mould are indicated by E, F and G respectively.

The parts E of the mould are rigidly attached to body portions or supporting members H, on which are fixed by means of screws K, guides L which slidably carry the movable parts F and G of the mould. When the parts E, F and G are in their normal position they are held separated from one another by pairs of springs M, N, O and P. These springs are housed in recesses F¹ provided in the part F and their free ends abut against those faces of the parts E and G which are adjacent to the part F. The movement of the slidable parts F and G under the influence of the pairs of springs M, N, O and P is restricted by plates S screwed to the supporting members H.

The method of operating the mould hereinbefore described is as follows:—

Figure 4:
Figure 4 shows two sheets of foil enclosing a piece of dough to be moulded.

The dough T for the production of a pipe stem is enclosed between two sheets of foil U and V (Figure 4), and the whole is placed between the two halves of the mould with the slidable parts F and G thereof spaced apart in an extended position. Each half of the mould is then moved towards the other transversely of the longitudinal axis 2—2 of the mould, and such a degree of pressure is exerted in that direction as to partially shape the foil and dough and force any excess thereof into the spaces W and X which exist between the parts E and F and F and G respectively of the mould, thereby causing the excess of foil to bulge into these spaces. The slidable parts G are thereupon forced with full pressure in the direction of the longitudinal axis 2—2 of the mould and towards the parts F and E, and finally the mould is closed with full pressure in the direction transverse to the longitudinal axis 2—2 thereof.

By the initial operation of partially closing the mould in a direction transverse to the longitudinal axis thereof whilst the slidable parts are in extended formation, those portions of the dough and foil which protrude into the spaces which separate the parts E, F and G, constitute an excess of foil and dough, and the subsequent operation of exerting full pressure upon the slidable portions F and G causes an accumulation of foil at the points where shoulders or enlargements are to be formed, so that these parts can be covered without cracking the foil.

Figure 5:
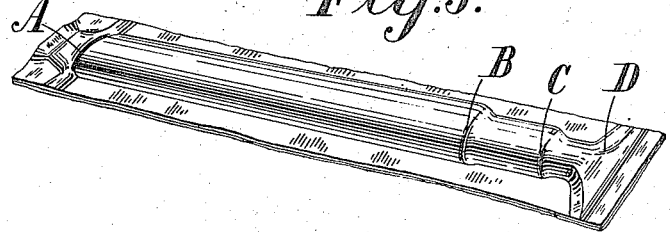
Figure 5 shows the form of the moulded dough and its foil casing after the preliminary operation of moulding has been effected.
Figure 6:
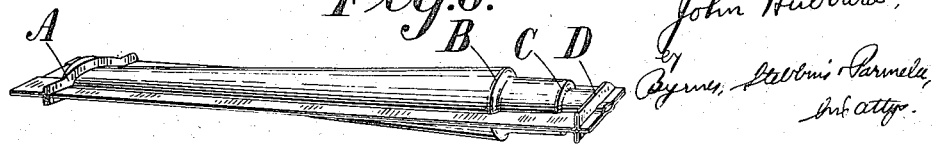
Figure 6 shows the final form of the foil casing and the moulded dough after the final operation of the mould has been completed.

After the mould has been initially operated in a direction transverse to the longitudinal axis thereof, the foil and the moulded article take the form illustrated in Figure 5, and when the subsequent full pressure is exerted upon the mould both along the longitudinal axis thereof and transversely thereto, the foil and the moulded dough take the shape illustrated in Figure 6.

After the final operation of the mould, the two halves of the same are separated from one another, and the foil sheath enclosing the moulded article, which is then in the shape illustrated in Figure 6, is removed from the mould and placed in the vulcanizing chamber. By this means a considerably greater number of articles may be vulcanized in the vulcanizing chamber than would be the case if the mould containing the article had to be placed therein, as the dimensions of the final article illustrated in Figure 6 are considerably smaller than those of the mould.

It will be understood that the moulds may be varied according to the shape of the articles to be manufactured.

In some cases it may be necessary to seal or partially seal the edges of the foil by folding or other interlocking means to prevent gaping when in the vulcanizing chamber.

As the mould does not have to be placed in the vulcanizing chamber, it may be made of materials other than metal, whereby the expense of manufacture can be reduced.

The spacing apart or closing up of the parts constituting the mould in the proper order may be effected automatically, and the articles or materials of which they are to be composed, with the foil, may be fed into the mould either by hand or by automatic means.

What I claim as my invention and desire to secure by Letters Patent is:

1. A mould comprising two halves having each a plurality of parts adapted, when assembled one against another, to enclose an elongated moulding cavity whereof the shape changes abruptly at places between portions of different size, one of said halves being separable from the other along a plane extending through the longitudinal axis of the cavity, and some of said parts in each half being also separable one from another along another plane which, when the parts are assembled, intersects said cavity at right-angles to said axis at a place where its shape changes abruptly so as to form, when separated, a gap extending across that place of change of shape and opening into said cavity.

2. A mould comprising two halves which, when assembled one against the other, enclose between them a moulding cavity whereof the shape changes abruptly at places; each half of the mould comprising a body portion extending parallel with the longitudinal direction of the cavity and having a fixed end portion directed transversely thereof, and at least one movable part slidable along said body portion towards and away from said end portion to provide gaps opening into the said cavity, the gaps being situated each at a place of abrupt change of shape of the cavity, and means on the body portion for retaining said movable part thereon, the movable parts of the two halves being shaped each to form part of the wall of said cavity.

3. A mould comprising two halves which, when assembled one against the other, enclose between them a moulding cavity whereof the shape changes abruptly at places; each half of the mould comprising a body portion extending parallel with the longitudinal direction of the cavity and having a fixed end portion directed transversely thereof, and at least one spring-controlled movable part slidable along the body portion towards and away from the end portion to provide gaps opening into said cavity, the gaps being situated each at a place of abrupt change of shape of the cavity, and a pair of under-cut longitudinal guides on the body portion for engaging each movable part and retaining the same on its allotted body portion; the movable parts of the two halves being shaped each to form part of the wall of said cavity.

4. A method of moulding a plastic mass into a body whereof the shape changes abruptly at places, and simultaneously covering it with a layer of foil, comprising the steps of inserting the mass between two layers of foil, partially shaping the mass under an initial pressure in one direction in such a manner as to cause an excess of the mass and foil to collect at the places of abrupt change of shape, applying full shaping pressure on the said excess of the mass and foil in a direction transverse to the first direction whilst maintaining the said initial pressure, and then increasing the initial pressure to its full amount in the first direction for shaping the mass and foil in the required final form.

5. A method of moulding a plastic mass into a body whereof the shape changes abruptly at places, and simultaneously enclosing it in a layer of foil, comprising the steps of inserting the mass with a layer of foil on each side of it into the moulding cavity of a multipart mould, partially shaping the mass under an initial pressure in one direction in the mould in such a manner as to cause an excess of the mass and foil to collect at the places of abrupt change of shape, applying full shaping pressure on the said excess of mass and foil in a direction transverse to the first direction whilst maintaining the said initial pressure and thereby partially closing the mould, and then increasing the initial pressure to its full amount in the first direction for completely closing the mould and thereby shaping the mass and foil in the required final form.

In testimony whereof I affix my signature.

JOHN HUBBARD.